United States Patent [19]

Terasita

[11] 4,395,099

[45] Jul. 26, 1983

[54] SCENE BRIGHTNESS MEASURING SYSTEM

[75] Inventor: Takaaki Terasita, Minami-ashigara, Japan

[73] Assignee: Fuji Photo Film Co., Ltd., Kanagawa, Japan

[21] Appl. No.: 260,410

[22] Filed: May 4, 1981

[30] Foreign Application Priority Data

May 2, 1980 [JP] Japan .................................. 55/58820

[51] Int. Cl.³ ....................... G03B 7/097; G03B 7/099
[52] U.S. Cl. ..................................................... 354/31
[58] Field of Search .......................... 354/31; 356/222

[56] References Cited

U.S. PATENT DOCUMENTS

| | | | |
|---|---|---|---|
| 3,772,517 | 11/1973 | Smith | 354/31 X |
| 4,085,320 | 4/1978 | Wilwerding | 354/25 X |
| 4,183,645 | 1/1980 | Ohmura et al. | 354/106 |
| 4,214,826 | 7/1980 | Uchida et al. | 354/31 |
| 4,306,787 | 12/1981 | Fukuhara et al. | 354/31 |

Primary Examiner—Michael L. Gellner
Attorney, Agent, or Firm—Pasquale A. Razzano

[57] ABSTRACT

A number of light receiving elements are used for measuring the brightness Bi of a number of parts of the scene and the maximum brightness Bmax and the minimum brightness Bmin are detected among the measured brightness values. Then, the scene brightness B is calculated by use of a formula:

$$B = K'_1 + K_2 \cdot Bmax + K_3 \cdot Bmin + \alpha \sum_{i=1}^{n} K(i+3) \cdot Bi.$$

Based on the scene brightness thus obtained, the aperture or shutter is controlled to obtain appropriate exposure. In case where the weighting coefficients for the number of light receiving elements are made equal to each other, the average brightness Bmean throughout the whole image is used.

13 Claims, 16 Drawing Figures

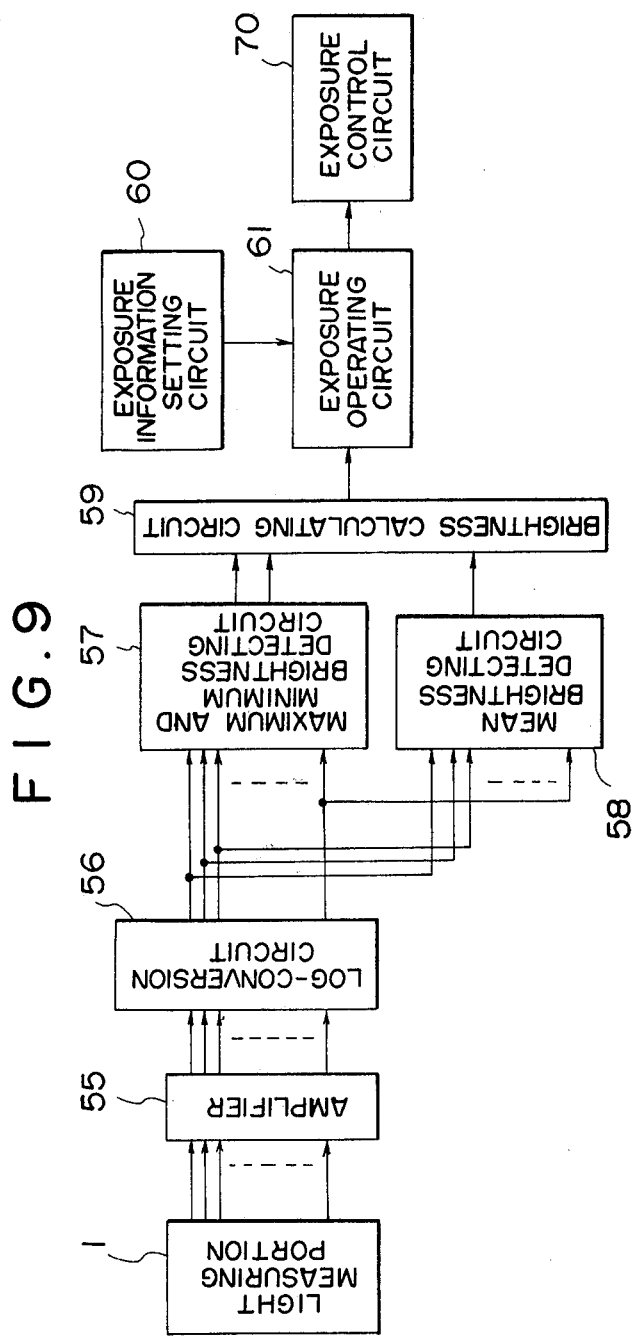
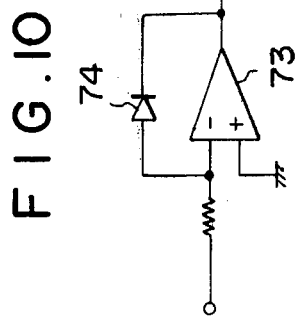

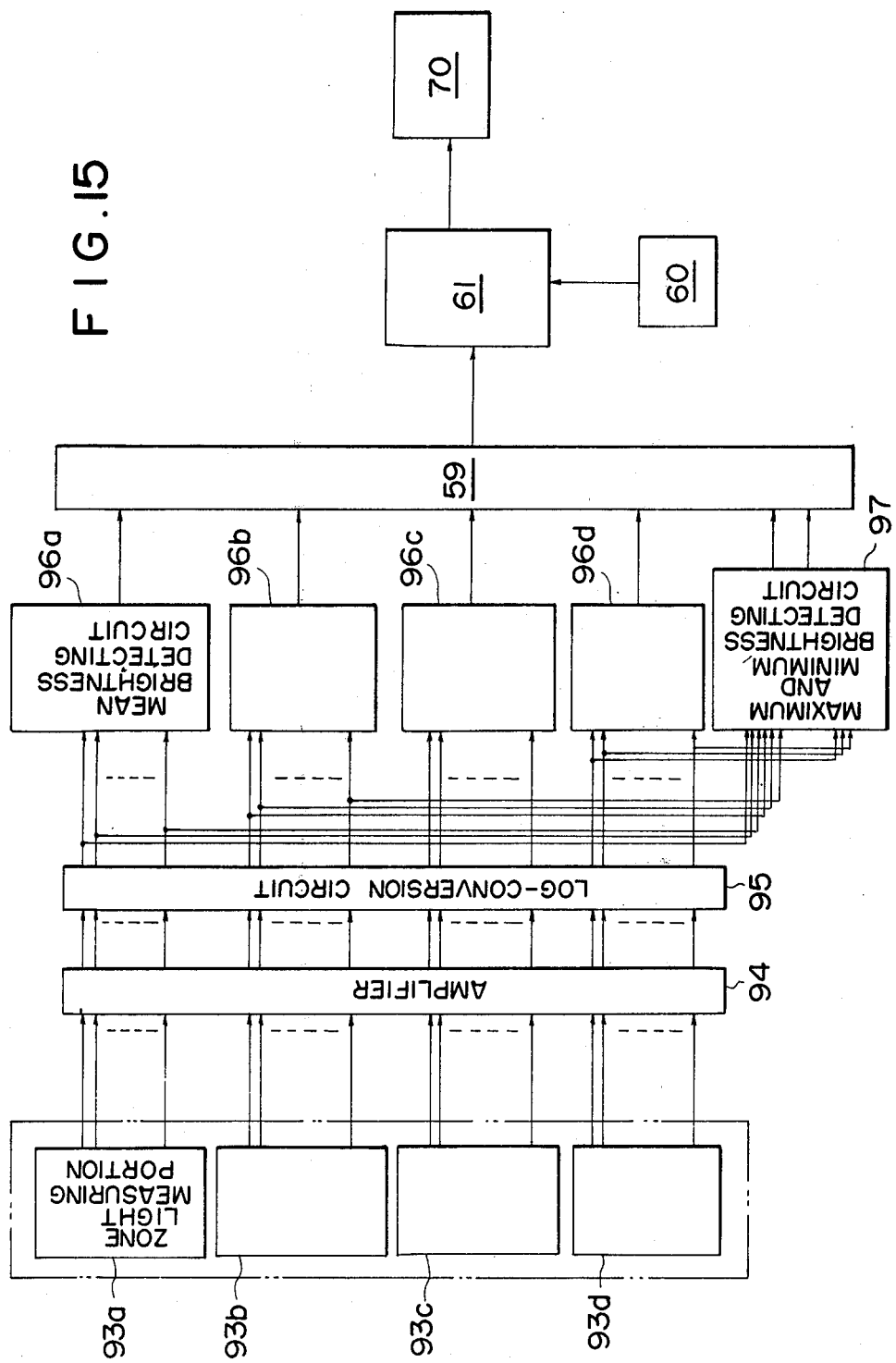

SCENE BRIGHTNESS MEASURING SYSTEM

BACKGROUND OF THE INVENTION

1. Field of the Invention

This invention relates to a scene brightness measuring system to be used for a photographic camera, motion picture camera, television camera and the like, and more particularly to a method of measuring the scene brightness by calculating the scene brightness from measured values of the maximum brightness, the minimum brightness and other brightness at various points of the scene.

2. Description of the Prior Art

In the light measuring method for measuring the scene brightness adopted in a photographic camera, there have been generally known and widely used three types of light measuring method. One is an average light measuring method in which one or two photosensors are used for measuring the brightness of the whole scene, another is a partial light measuring method in which the brightness of only a part of the scene is measured, and the third is a center-weighted light measuring method in which the central portion of the scene is weighted in the light measurement.

Recently, it has been proposed to use a number of photosensors to measure the brightness at various points of the scene and obtain the maximum and minimum values of the brightness, and determine the scene brightness using one of extreme values according to the brightness distribution of the scene or using a middle value between the two extreme values. These methods are intended to measure the brightness of the principal subject matter as accurately as possible to obtain an appropriate exposure of the principal subject matter. These methods, however, have a drawback that the principal subject matter gets under-exposure in case where the scene has a backlight or over-exposure in case where the principal subject matter is a spotlighted matter in a dark background.

SUMMARY OF THE INVENTION

The principal object of the present invention is to provide a light measuring system for obtaining the appropriate brightness of the aimed principal subject matter even when the scene has a special brightness distribution.

A further object of the present invention is to provide a scene brightness measuring system using a number of photosensors to measure the brightness of various points of the scene and calculating the appropriate brightness from the measured values of the brightness.

The scene brightness measuring system in accordance with the present invention is characterized in that a predetermined number n of photosensors are used for measuring the brightness of various parts of the scene and calculating the scene brightness B by use of the following formula wherein Bmax is the maximum brightness among those measured, Bmin is the minimum brightness among those measured, Bi is the brightness of the various parts of the scene, $K_1$ to $K_{(i+3)}$ and $\alpha$ is coefficients:

$$B = K_1 + K_2 \cdot B\text{max} + K_3 \cdot B\text{min} + \alpha \sum_{i=1}^{n} K_{(i+3)} \cdot B_i \quad (1)$$

According to the scene brightness B thus calculated, the exposure is controlled in the camera similarly to the conventional camera exposure system.

The brightness Bi at various parts of the scene is necessary to obtain the brightness distribution of the scene. Since in the backlight scene the principal subject matter has the minimum brightness Bmin, the minimum brightness Bmin is important. Since the spotlighted scene the principal subject matter has the maximum brightness Bmax, the maximum brightness Bmax is also important for scene brightness measurement for exposure control. The minimum brightness Bmin and the maximum brightness Bmax are not located at a fixed point and accordingly have an important meaning differently from the measured values of brightness Bi at the fixed positions $$\sum_{i=1}^{n} K_{(i+3)} \cdot B_i$$

and have a crucial significance for certain kinds of scene.

The aforesaid brightness values Bmax, Bmin, Bi may be either log-converted values or values before log-conversion. In other words, the output of the photosensors may be used as is or after being log-converted for the calculation.

The coefficients $K_2$ to $K_{(i+3)}$ for weighting the outputs of the photosensors are determined in view of the relationship between the position of the measuring point and the position of the principal subject matter and the degree of importance of the measuring point which are statistically obtained to result at first appropriate exposure of the principal subject matter and secondly appropriate exposure of the background.

Said formula (1) will need a little complicated structure in the device for carrying out the weighting of various parts of the scene. In a compact camera which is to be simple and cheap and may be less accurate, therefore, the weighting coefficients may be made equal for all the parts of the scene. In this case, the fourth term of the right side of the formula (1) may be replaced by a mean brightness Bmean of the whole scene. The mean brightness Bmean is obtained by $$\alpha \cdot B\text{mean} = \alpha \sum_{i=1}^{n} \frac{K_4}{n} \cdot B_i$$

In this case, the scene brightness can be represented by the following formula;

$$B = K_1 + K_2 \cdot B\text{max} + K_3 \cdot B\text{min} + \alpha \cdot B\text{mean} \quad (2)$$

Generally, in the backlight scene, the upper part of the scene has high brightness, and in the spotlighted scene the background has low brightness. Therefore, in these scenes having special brightness distribution, the accuracy of light measurement can be enhanced by using mean brightness of a particular area of the scene rather than using the mean brightness of whole the scene. Further, the system using the brightness of a particular area of the scene makes the structure of the device and the calculation simple as compared with the weighted brightness system as mentioned above. Thus, the light measuring system in which the brightness of a particular area or areas is used for calculating the scene brightness is practically advantageous as compared with various conventional light measuring systems.

Then, it is desirable to divide the scene into several zones in each of which the mean brightness Bmean is to be measured and weighted to provide as appropriate brightness value as possible. The scene brightness thus provided can be represented by the formula as follows;

$$B = K_1 + K_2 \cdot Bmax + K_3 \cdot Bmin + \alpha \sum_{i=1}^{n} K_{(i+3)} \cdot Bmean(i). \quad (3)$$

In accordance with the present invention, the scene brightness B is obtained by use of the above mentioned formula (1), (2) or (3). Based on the measured brightness, the exposure is controlled by controlling the shutter speed, the aperture size or both of these factors.

The weighting coefficients $K_{(i+3)}$ in formula (1) may be the same for all the scenes. However, if they are changed according to the kind of the scene classification, the accuracy of exposure control based on the measured brightness will be further enhanced. For instance, in case of the backlit scene, the upper part or the marginal part is generally bright being in most cases 10 EV or more. In case of the scene having a dark background as a spotlighted scene, the marginal part is very dark and the upper-central part is bright. Therefore, in the backlit scene, the central or lower part of the scene has a very important brightness for exposure control and accordingly the coefficient for weighting the brightness Bi is desired to be changed in those parts of the scene. Hence, it is desired to classify the scenes according to the brightness distribution or distance of the principal subject matter. The classification is, therefore, made in view of the kind of the scene determined by way of the distance or the brightness distribution or both of these factors.

The method of classifying the scenes based on the brightness distribution is classified into a first method in which the scene is divided into several zones each providing mean brightness Bmean, a second method using the output of photosensors at predetermined positions in the scene, and a third method in which the contrast of the scene is used. The classification may be conducted by use of additional photosensors particularly prepared for the classification or may be conducted by use of the photosensors used for measuring the scene brightness.

It should be noted that the weighting coefficients should be changed when the picture format is changed, that is, when the position or angle of the camera is changed, for instance from a horizontal position to a vertical position. Therefore, it is desirable to change the coefficients in response to change in the position or angle of the camera which is automatically detected by means of position or angle detecting means attached to the camera.

BRIEF DESCRIPTION OF THE DRAWING

FIG. 9 is a block diagram showing an exposure control device used for an embodiment in which the scene brightness is calculated by use of the mean brightness of the whole scene, FIG. 10 is a circuit view showing a log-conversion circuit, FIG. 15 is a block diagram showing an exposure control device used for an embodiment in which the scene brightness is calculated by use of the mean brightness of the divided zones of the scene.

DESCRIPTION OF THE PREFERRED EMBODIMENTS

Figure 1:
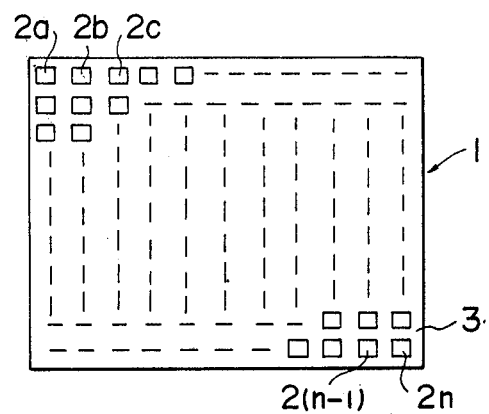
FIG. 1 is a front view of the light measuring portion.

FIG. 1 is a front view showing a light measuring portion employed in the present invention. Referring to FIG. 1, a number of photosensors $2a, 2b, \ldots 2(n-1), 2n$ are provided on a base board 3 of a light measuring portion 1. The photosensors $2a-2n$ may be photodiodes, photovoltaic type photoelectric elements, phototransistors, CdS elements, photocharge storing type CCD's and the like. When the CCD is used, the sensitivity should better be controlled by changing the storage time according to the scene brightness since the dynamic range of the CCD is narrow.

Figure 2:
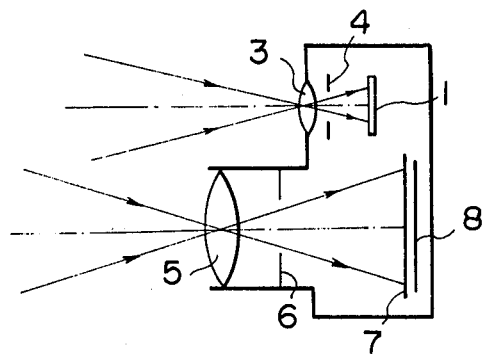
FIG. 2 is a schematic side sectional view of a camera showing an example of the arrangement of the light measuring portion.

FIG. 2 shows an example of the arrangement of the light measuring portion in which the light measuring portion measures the light through an optical system different from the taking lens. The light measuring portion 1 is located just behind an objective 3 above a taking lens 5. A stop 4 is provided between the objective 3 and the light measuring portion 1. The taking lens 5 is provided in front of an aperture 6 to focus an image of the scene onto a photographic film 8. A focal plane shutter 7 is provided immediately in front of the film 8. The aperture 6 may be interconnected with the stop 4 so that the stop 4 may be controlled in association with the aperture 6.

Figure 3:
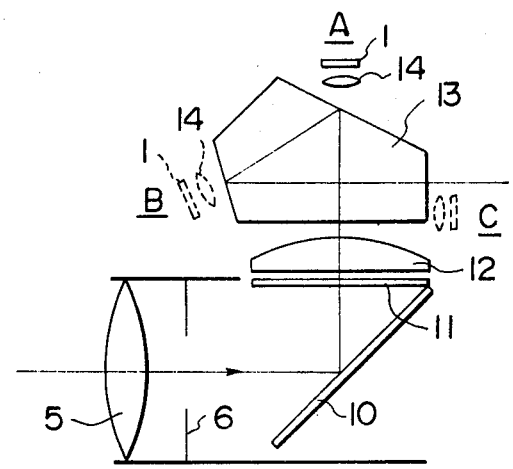
FIG. 3 is a schematic side sectional view of a camera showing another example of the arrangement of the light measuring portion.

FIG. 3 shows another example of the arrangement of the light measuring portion. The light measuring portion is designated by the same reference numeral 1 as in FIG. 2. In this example, the light measuring portion 1 is located close to the pentagonal dach prism 13 of a single lens reflex camera. The pentagonal dach prism 13 is located above a condenser lens 12 on a focusing glass 11 onto which an image is focused by a taking lens 5 through an aperture 6 and a swing up mirror 10. Just in front of the light measuring portion 1 is provided a focusing lens 14. The position of the light measuring portion 1 and the focusing lens 14 may be above, in front of or behind the pentagonal dach prism 13 adjacent to a surface of the prism 13 which is partially made semi-transparent.

Figure 4:
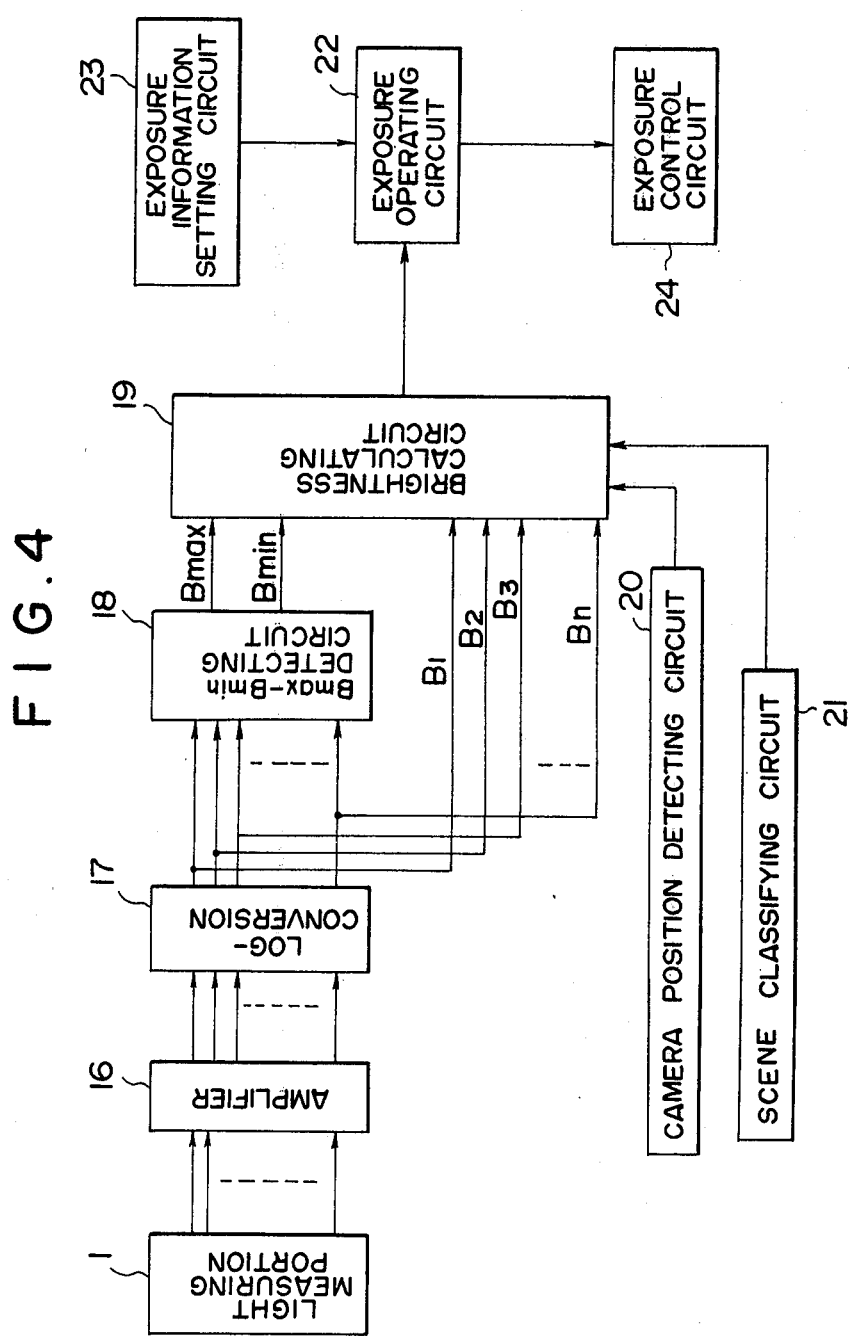
FIG. 4 is a block diagram showing an exposure control device for carrying out the exposure control based on the scene brightness measured in accordance with the present invention.

FIG. 4 shows an embodiment of the exposure control device for carrying out the exposure control based on the scene brightness measured by the present invention. A light measuring portion 1 consisting for instance of 25 photodiodes arranged in 5 columns and 5 rows is connected with an amplifier 16 for amplifying the output of the former. The output of the latter is connected with a log-conversion circuit 17 for log-compressing the output thereof to obtain brightness Bi of the photodiode at the position (i) in which i is 1 to 25. The output Bi of the log-conversion circuit 17 is inputed into a Bmax-Bmin detecting circuit 18, where the outputs of the log-conversion circuit 17 are compared with one another to detect the maximum brightness Bmax and the minimum brightness Bmin. The detected Bmax and Bmin and the brightness outputs Bi from the log-conversion circuit 17 are all sent to a brightness calculating circuit 19, where said formula (1) is operated to calculate the scene brightness B.

The brightness calculating circuit 19 is further provided with signals from a camera position detecting circuit 20 and a scene classifying circuit 21 so that the weighting coefficients $K_{(i+3)}$ may be properly selected according to the position or angle of the camera and the kind of the scene.

The calculated brightness B is sent to an exposure operating circuit 22 from the brightness calculating circuit 19 and then sent to an exposure control circuit 24 together with information from an exposure information setting circuit 23 such as the film sensitivity (Sv). Thus, the brightness (Bv) and the film sensitivity (Sv) are calculated together with preselected shutter speed (Tv) or aperture size (Av) to give an output to control the aperture size or shutter speed or both of these factors in the exposure control circuit 24 which is well known in the art.

As the coefficients in the formula (1), the following values may be used for instance:

$$K_1 = 0.82, K_2 = 0.01, K_3 = 0.14, \alpha = 0.005.$$

Further, as the weighting coefficients $K_4$-$K_{28}$ for the photodiodes, the values as shown in TABLE 1 may be used for instance. The values shown in TABLE 1 show the weighting coefficients at the corresponding positions on the light measuring portion 1.

TABLE 1

| | | | | |
|---|---|---|---|---|
| 2 | 1 | 1 | 1 | 2 |
| 2 | 2 | 2 | 2 | 2 |
| 2 | 3 | 4 | 3 | 2 |
| 2 | 3 | 10 | 3 | 2 |
| 3 | 4 | 5 | 4 | 3 |

The above table shows the weighting coefficients for the horizontal position of the camera. Therefore, when the positon or angle of the camera is changed from the horizontal position to the vertical position, the weighting coefficients are changed from those as shown in Table 1 to those shown in TABLE 2 (right side up and left side down) or those shown in Table 3 (left side up and right side down) according to the signal from the camera position detecting circuit 20.

TABLE 2

| | | | | |
|---|---|---|---|---|
| 2 | 2 | 2 | 2 | 3 |
| 1 | 2 | 3 | 3 | 4 |
| 1 | 2 | 4 | 10 | 5 |
| 1 | 2 | 3 | 3 | 4 |
| 2 | 2 | 2 | 2 | 3 |

TABLE 3

| | | | | |
|---|---|---|---|---|
| 3 | 2 | 2 | 2 | 2 |
| 4 | 3 | 3 | 2 | 1 |
| 5 | 10 | 4 | 2 | 1 |
| 4 | 3 | 3 | 2 | 1 |
| 3 | 2 | 2 | 2 | 2 |

The above weighting coefficients may be used commonly to all scenes. However, it is possible and sometimes desirable to change the weighting coefficients $K_4$-$K_{28}$ according to the kind of the scene to enhance the accuracy of the exposure control. In order to change the weighting coefficients according to the kind of the scene, it is necessary to classify the scenes into several kinds so as to select the mode of weighting coefficients based thereon.

Now the method of classifying the scenes will be described. At first, a method of classifying the scenes based on the distance of the principal subject matter will be described in detail. According to the statistic data processing, it has been proved that there are relationships between the distance of the subject matter and the kind of the subject matter as follows.

| | |
|---|---|
| Long distance | View including the sky: the principal portion is located lower than the center of the image. |
| Intermediate distance | Full-length figure: the principal portion is located at the center. |
| Short distance | Half-length figure; portrait: the principal portion spreads over an upper-central part of the image. |

The scene classifying circuit 21, therefore, generates a signal which indicates whether the distance is long, short or intermediate. The scene classifying circuit 21 is connected with an automatic focus controlling device or a distance measuring device connected with a focusing lens or taking lens. When the scene classifying circuit gives an output indicating that the distance is long, the weighting coefficients as shown in TABLE 1 are modified to make the values in the marginal range smaller and make those in the central part larger. When the scene classifying circuit gives an output indicating that the distance is short, the weighting coefficients as shown in TABLE 1 are modified to make the values in the marginal range a little larger.

Figure 5:
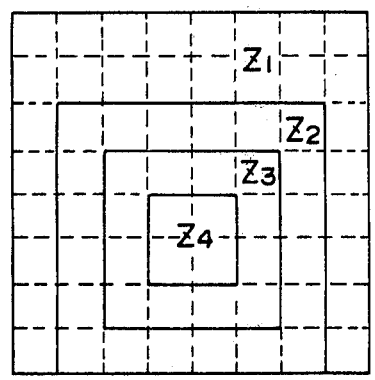
FIG. 5 is a front view of the light measuring portion showing an example of the division into zones.

Now another method of classifying the scenes will be described in which the image is divided into several zones in each of which the brightness is measured separately. For instance, 64 photodiodes are arranged in 8 columns and 8 rows as shown in FIG. 5 and are grouped into 4 zones Z1 to Z4. In each zone, the mean brightness is calculated. In determining the backlight scene and the spotlighted scene, the following formulae are used.

$$(\text{Z1's mean brightness}) - (\text{Z4's mean brightness}) > \beta \quad (4)$$

$$(\text{Z1's mean brightness}) - (\text{Z4's mean brightness}) < \beta \quad (5)$$

The scene satisfying the formula (4) is determined as a backlit scene, and the scene satisfying the formula (5)

is determined as a spotlighted scene. The "$\beta$" is for instance a level of brightness, 1 EV.

By these formulae (4) and (5), the scenes are classified into two classifications and the weighting coefficients $K_4$-$K_{67}$ for the 64 photodiodes are changed between two modes of coefficients. Further, in such a case, it is desirable to also change the weighting coefficients $K_2$ and $K_3$ for the maximum brightness Bmax and the minimum brightness Bmin and the constant $K_1$.

Furthermore, the classification of the scenes can be conducted by seeing whether the differences of the following formulae are larger than predetermined values.

$$(Z1\text{'s mean bright.} + Z2\text{'s mean bright.}) - (Z3\text{'s mean bright.} + Z4\text{'s mean bright.}) \qquad (6)$$

$$(\text{mean bright. of whole image}) - (Z3\text{'s mean bright.} + Z4\text{'s mean bright.}) \qquad (7)$$

The mean brightness of the respective zones may be the mean value before the log-conversion or that after the log-conversion. When the difference of the formula (6) is larger than a predetermined value, it is determined that the scene has a bright background. When the difference is smaller than another predetermined value, it is determined that the scene has a dark background. From the formula (7), the similar determination is possible.

Figure 6:
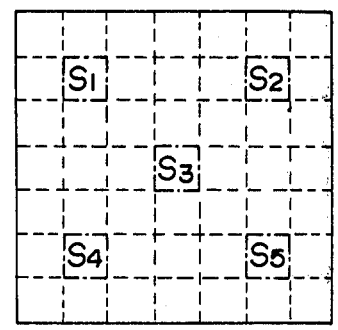
FIG. 6 is a front view of the light measuring portion showing an example in which brightness of particular positions is used for classifying the scenes.

Another method of classifying the scenes is to see the difference between the weighted sum of the outputs of particular photodiodes and the simple mean brightness of the whole image. As shown in FIG. 6, 49 (7×7) photodiodes are used in the light measuring portion and five photodiodes B1-B5 among them are used to provide the weighted sum $$\sum_{i=1}^{n} Ki \cdot Bi$$

The outputs of all the photodiodes are used to provide the mean brightness Bmean. Then, the following calculation is conducted to determine whether the scene is a backlit scene.

$$\sum_{i=1}^{n} Ki \cdot Bi - B\text{mean} > \beta. \qquad (8)$$

The scene satisfying the above formula is determined as the backlight scene, and the scene not satisfying the same is determined as of normal illumination. The Bmean may be substituted for by the output B3 of the central photodiode or the simple mean of the outputs of the five photodiodes $$1/5 \sum_{i=1}^{n} Bi.$$

It will of course be understood that the number of the photodiodes is not limited to five but may be more.

It is further possible to classify the scenes based on the contrast of the image of the scene. For instance, the scene having a low contrast is highly probably the long distance view of scenery or a portrait under well diffused illumination from front of the figure. Therefore, in such a case the weighting coefficients are desired to be small and similar. On the other hand, the scene having a high contrast is highly probably a backlit scene or spotlighted scene. In such a case, the weighting coefficients are modified to greatly weight the photodiode outputs in the lower half of the scene in case of a backlit scene and in the central part of the scene in case of a spotlighted scene.

For instance, when Bmax − Bmin < 7.0 (EV), the scene is determined to be of low contrast and the weighting coefficients shown in Table 4 are used.

TABLE 4

| 2 | 2 | 2  | 2 | 2 |
|---|---|----|---|---|
| 3 | 4 | 5  | 4 | 3 |
| 3 | 4 | 12 | 4 | 3 |
| 4 | 5 | 6  | 5 | 4 |

The above table shows the weighting coefficients $K_4$-$K_{23}$ for 20 (5×4) photodiodes of the light measuring portion. For the other coefficients in the formula (1) can be used the following values. $K_1 = 0.87$, $K_2 = 0.06$, $K_3 = 0.14$, $\alpha = 0.005$.

When Bmax − Bmin > 7.0 (EV), the scene is determined as high contrast and the weighting coefficients for the photodiodes in the lower half of Table 4 are increased.

Furthermore, the contrast of the scene can be represented not only by the difference between the two extreme values, Bmax − Bmin, but also by the difference between other values such as Bmax − Bmean or Bmean − Bmin. Further, the Bmax and Bmin may be replaced by the output of the photodiode located at the position where the Bmax or Bmin appears most frequently, e.g. the central photodiode.

Still another method of classifying the scenes will be described. Since the backlit scene has a bright background, such as the sky, the mean brightness and the maximum brightness are usually high. Therefore, by determining if Bmean > $\beta$ (e.g. 16 EV) or Bmax > $\gamma$ (e.g. 20 EV), or both of these conditions, it is possible to classify the scenes into backlit scene and others. On the other hand, since the scene having a dark background has a low mean brightness Bmean and low Bmin, it is also possible to classify the scenes into the dark background scenes and the others by determining if Bmean < $\beta'$ (e.g. 14 EV), Bmin < $\gamma'$ (e.g. 12 EV) or both of these conditions.

In the above method, when Bmean > 16 EV, the scene is determined as backlight scene and the weighting coefficients $K_1$ to $K_{23}$ and $\alpha$ are selected to be as follows and as shown in Table 5. $K_1 = 1.26$, $K_2 = 0.06$, $K_3 = 0.04$, $\alpha = 0.005$.

TABLE 5

| 2 | 1 | 1  | 1 | 2 |
|---|---|----|---|---|
| 2 | 3 | 4  | 3 | 2 |
| 3 | 5 | 10 | 5 | 3 |
| 4 | 7 | 7  | 7 | 4 |

Further, when Bmean < 16 EV, the scene is determined as normal illumination scene and the weighting coefficients are selected to be as follows and as shown in Table 6. $K_1 = 0.62$, $K_2 = -0.07$, $K_3 = 0.05$, $\alpha = 0.005$.

TABLE 6

| 3 | 3 | 3  | 3 | 3 |
|---|---|----|---|---|
| 4 | 4 | 5  | 4 | 4 |
| 4 | 5 | 12 | 5 | 4 |
| 5 | 5 | 6  | 5 | 5 |

Figure 7:
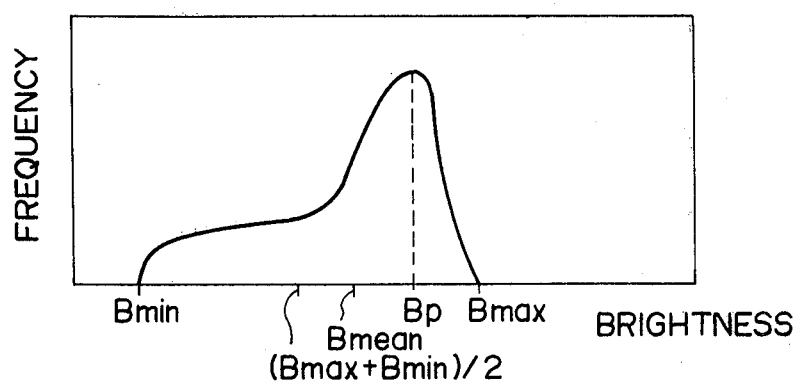
FIG. 7 is a histogram showing the brightness distribution of a backlit scene.

Since the backlit scene is occupied by a large bright background, a histogram as shown in FIG. 7 is obtained in case of the backlit scene in which the ordinate represents the frequency and the abscissa represents the brightness. Then, by using the following formula, it is determined if a scene is a backlit scene or not.

$$(B\max + B\min)/2 - B\text{mean} < \beta \qquad (9)$$

As $\beta$ is used 1 EV here. The scene not satisfying the formula (9) is determined as a scene having a dark background. The $(B\max + B\min)/2$ may be replaced by the brightness $Bp$ at the peak of frequency.

The above description of the method of classifying the scenes is all directed to the method in which the scenes are divided into two classifications. It should be noted, however, that the scenes can be classified into more than two classifications such as backlight, spotlight and normal illumination. Further, by combining some of the above methods, it is possible to increase the number of classifications into which the scenes are classified. For instance, by using $B\text{mean} > 16$ EV and $B\text{mean} \leq 16$ EV, the scenes are classified into two groups and further by checking if the difference in brightness between the central part and the marginal part is larger than 1 EV, the scenes are further classified into two groups, resulting four groups in all. Further, the mode of weighting coefficients is changed between the vertical position and the horizontal position. Therefore, the mode of weighting is changed into various types according to the divided classifications.

Now the exposure control device employing a digital circuitry will be described in detail in combination with the scene brightness measuring system in accordance with the present invention.

Figure 8:
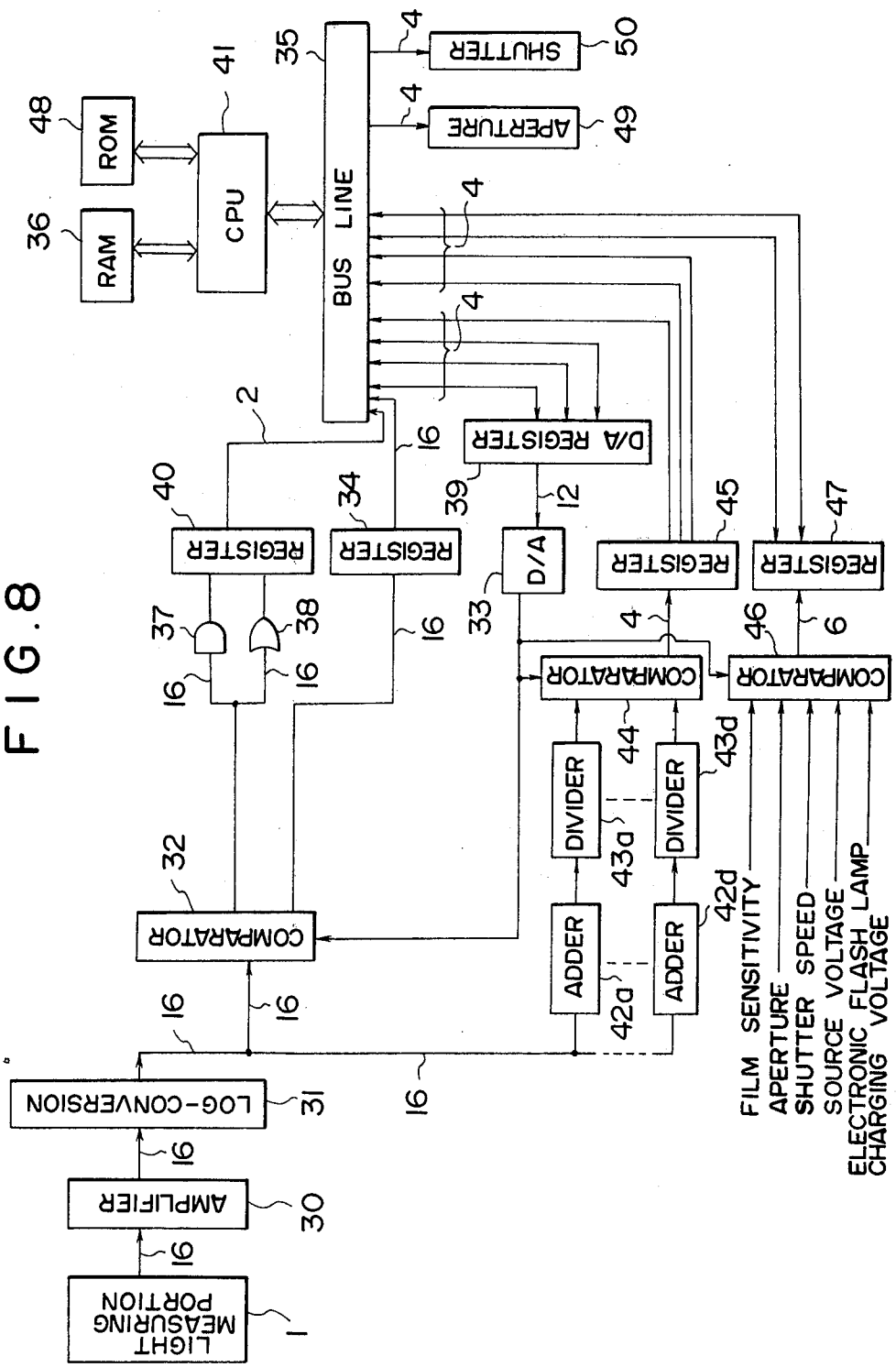
FIG. 8 is a block diagram showing an exposure control device using a microcomputer.

Referring to FIG. 8, a light measuring portion 1 including a number of photodiodes is connected with an amplifier 30 where the output of the photodiodes is amplified. The output of the amplifier 30 is sent to a log-conversion circuit 31 and is log-converted thereby.

The log-converted signal is sent to a comparator 32 where the signal is compared with a standard signal from a D/A converter 33. The output signal from the comparator 32 is memorized in a register 34 and then sent to a RAM 36 by way of a bus line 35. Further, on the other hand, the output signal from the comparator 32 is inputed into an AND gate 37 and an OR gate 38 connected in parallel between the comparator 32 and another register 40.

The D/A converter 33 is connected with a D/A register 39 which is connected with the bus line 35 to memorize the data sent therefrom. The analog output signal obtained by D/A conversion at the D/A converter 33 increases from the minimum value to the maximum value. With this analog output signal from the D/A converter 33 made standard, the output signal of the photodiodes is compared at the comparator 32. The output of the D/A converter 33 at the time when the level of the output of the AND gate 37 has changed from "0" to "1" corresponds to the maximum brightness, and the output of the converter 33 at the time when the level of the output of the OR gate 38 has changed from "0" to "1" corresponds to the minimum brightness. A signal which indicates that the output level of these gates 37,38 has changed is sent to a CPU 41 by way of the bus line 35 after memorized by the register 40.

As mentioned above, the inversion of the output of the AND gate 37 and the OR gate 38 is detected and from the signal memorized in the D/A register 39 at that moment the maximum brightness $B\max$ and the minimum brightness $B\min$ are obtained in a digital form, which digital values are memorized in the RAM 36.

On the other hand, the brightness of various parts of the image from the log-conversion circuit 31 is known from the value at the D/A register 39 when the output of the comparator 32 has been inversed and is A/D-converted to be memorized at the corresponding address in the RAM 36.

When an image is divided into a plurality of zones $Z_1$ to $Z_4$ as shown in FIG. 5 to classify the scene according to the difference in measured brightnesses of the zones $Z_1$ to $Z_4$, and the weighting coefficients are selected based on the classified kind of the scene, the mean brightness in each zone is calculated in the following manner. Adders 42a to 42d are provided for the respective zones $Z_1$ to $Z_4$, and output signals from photodiodes included in each zone are inputed into each adder to be added in analog form. The obtained sums for the zones $Z_1$ to $Z_4$ are transmitted to dividers 43a to 43d, respectively, to calculate the mean brightnesses of the respective zones.

The mean brightness of the respective zones are sent to a comparator 44 where the mean brightnesses are compared with a standard signal from said D/A converter 33. When the comparator 44 outputs an identity signal, the identity signal is once stored in a register 45 and then sent to the bus line 35. The value stored in the D/A register 39 at the time when the identity signal is generated becomes a digital value of the mean brightness. Thus, the mean brightness in each zone is A/D-converted and memorized at a predetermined address in the RAM 36.

Similarly, various kinds of information necessary for exposure control are A/D-converted by means of the comparator 46 and the register 47 and are memorized at the corresponding addresses in the RAM 36. The mean brightnesses in the respective zones stored in the RAM 36 are read out to be used for classification of the scene. Then, the weighting coefficients selected according to the kind of the scene are read out from a ROM 48. The selected weighting coefficients and the brightnesses read out from the RAM 36 are used to operate formula (1) to obtain the scene brightness B. Based on the scene brightness B thus obtained and the exposure information such as the film sensitivity, the aperture 49 and/or the shutter 50 are automatically controlled.

As well as a number of combinations of weighting coefficients for a number of classifications into which the scenes are classified, a number of programs for various sequences such as for taking up the maximum brightness, the minimum brightness, the brightness of each part, the mean brightness used for classifying the scenes and the exposure information, for classifying the scenes, for calculating brightness information, for operating exposure and for controlling exposure are memorized in said ROM 48.

Instead of taking up the characteristic values for classifying the scenes obtained through analog operations in the above described manner, the characteristic values for classifying the scenes may be detected by comparing the various data after storing the outputs of the photodiodes which have been converted into digital form in the RAM 36.

Although, in the above embodiment, the brightnesses of the different parts of the scene are differently weighted, the sum obtained by adding the brightnesses of the parts equally weighted may be used in order to simplify the structure of the device and the calculation. For instance, a mean brightness Bmean of the whole scene, or the sum of weighted mean zone brightnesses Bmean (i) may be used.

In an embodiment shown in FIG. 9, the scene brightness is calculated by the formula (2), using the mean brightness Bmean throughout the whole image. In FIG. 9, the outputs of photodiodes constituting a light measuring portion 1 are amplified by an amplifier 55 and sent to a log-conversion circuit 56 to be log-compressed. The log-compressed signals are inputed into a maximum and minimum brightness detecting circuit 57 to detect the maximum brightness Bmax and minimum brightness Bmin. The log-compressed signals are also inputed into a mean brightness detecting circuit 58, where the mean brightness Bmean is calculated by use of a formula $$Bmean = \sum_{i=1}^{n} Bi/n$$

wherein n is the number of photodiodes. The outputs of the photodiodes may be averaged before log-compression and the averaged value may be log-compressed to give the mean brightness Bmean. However, the former is advantageous over the latter.

The maximum brightness Bmax, the minimum brightness Bmin and the mean brightness Bmean are inputed into a brightness calculating circuit 59, where the scene brightness B is calculated by use of the formula (2), i.e., $$B = K_1 + K_2 \cdot Bmax + K_3 \cdot Bmin + \alpha \cdot Bmean.$$

The scene brightness B thus obtained and the exposure information from an exposure information setting circuit 60 are inputed into an exposure operating circuit 61 to calculate an appropriate shutter speed and/or an appropriate aperture size. The result is sent to an exposure control circuit 70 to control the aperture and the shutter.

As the coefficients K in the formula (2), the following values may be used for instance.
$K_1 = 1.64$
$K_2 = 0.08$
$K_3 = 0.16$
$\alpha = 0.69$.

The following 1251 scenes were photographed with the exposure being controlled using various light measuring methods.

| scene having a low contrast | 110 scenes |
| backlight scene | 258 scenes |
| scene including a high brightness portion (the sky, window, light source) | 143 scenes |
| scene in which the principal subject matter is high-lighted | 86 scenes |
| scene in which the principal subject matter is spotlighted | 28 scenes |

When using the conventional average light measuring method, the exposure was inappropriate in 272 scenes out of the 1251 scenes. When using the conventional central part weighted light measuring method, the exposure was inappropriate in 111 scenes out of the 1251 scenes. When the exposure was determined based only on the maximum brightness Bmax and the minimum brightness Bmin without using the mean brightness Bmean, only 120 scenes out of the 1251 scenes got appropriate exposure.

On the other hand, when the exposure was determined by use of the formula (2), only 88 scenes out of the 1251 scenes got inappropriate exposure.

This proves that the method of the present invention is advantageous over the conventional light measuring methods.

FIG. 10 shows an example of a log-conversion circuit 56 which can be employed in the present invention. The log-conversion circuit 56 comprises an operational amplifier 73 and a log-diode 74 connected in the feed-back circuit thereof. Such a log-conversion circuit 56 is provided for each photosensor.

Figure 11:
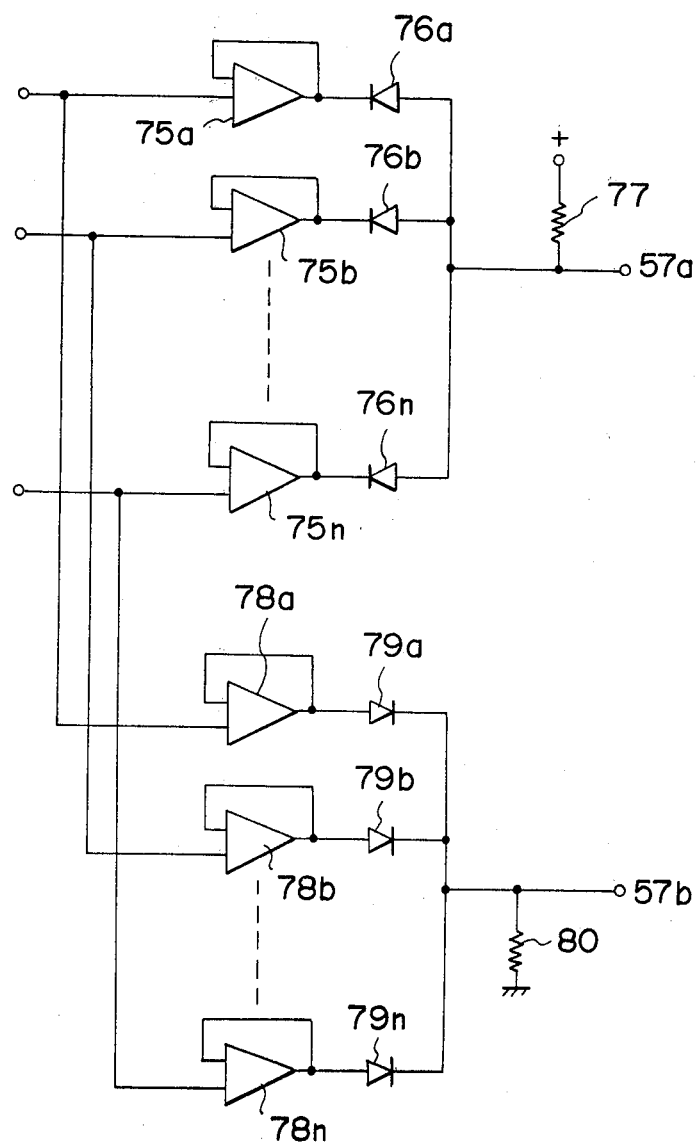
FIG. 11 is a circuit view showing a maximum and minimum brightness detecting circuit.

FIG. 11 shows an example of the maximum and minimum brightness detecting circuit. The log-converted outputs of the photosensors are respectively inputed in voltage follower circuits 75a to 75n to be impedance-converted. The output which is lowest in its voltage among the outputs of the voltage follower circuits 75a to 75n is outputed from a terminal 57a by virtue of diodes 76a to 76n and a resistor 77. The output of the lowest voltage corresponds to the minimum brightness. Similarly, the output which is the highest in its voltage among the outputs of voltage followers 78a to 78n is outputed from a terminal 57b by virtue of diodes 79a to 79n and a resistor 80. The output of the highest voltage corresponds to the maximum brightness.

Figure 12:
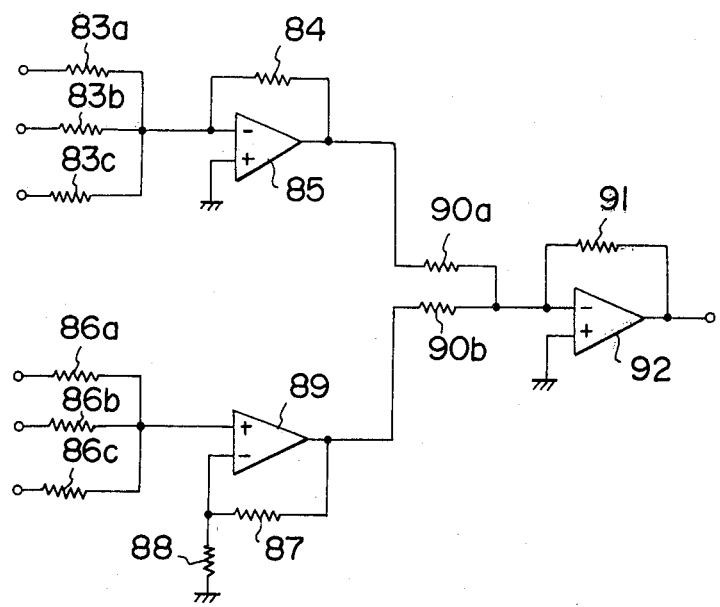
FIG. 12 is a circuit view showing a brightness operating circuit.

FIG. 12 shows in detail an example of the exposure calculating circuit 61. In FIG. 12, resistors 83a to 83c and 84 and an inversion amplifier 85 constitute an inversion amplifying adder, into which terms having a positive coefficient K in the formula (2) are inputed. Similarly, resistors 86a to 86c, 87 and 88 and non-inversion amplifier 89 constitute a non-inversion amplifying adder, into which terms having a negative coefficient K in the formula (2) are inputed. When the coefficients K in the formula (2) are all positive, the non-inversion amplifying adder may be omitted.

The values of the resistors 83a to 83c and 86a to 86c are selected according to the values of the coefficients K.

The outputs of the inversion amplifying adder and the non-inversion amplifying adder are inputed into an inversion amplifying adder constituted of resistors 90a, 90b and 91 and an inversion amplifier 92. The latter inversion amplifying adder outputs a signal corresponding to the scene brightness B in the formula (2).

Figure 13:
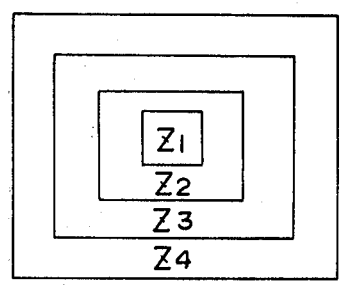
FIGS. 13, 14A and 14B are front views showing the examples of division of light measuring areas.

Now another embodiment of the present invention will be described referring to FIG. 13. This embodiment is based on an empirical law that the principal subject matter of a photograph is generally located at the center. Thus, the scene is divided into four zones $Z_1$ to $Z_4$ as shown in FIG. 13.

In this case, the scene brightness B is represented by the following formula.

$$B = K_1 + K_2 \cdot Bmax + K_3 \cdot Bmin + \sum_{i=1}^{4} K_{(i+3)} \cdot Bmean(i)$$

As the coefficients K, the following values may be used for instance.
$K_1 = 1.61$
$K_2 = 0.04$
$K_3 = 0.14$
$K_4 = 0.40$ (coefficient for the zone $Z_1$)
$K_5 = 0.07$ (coefficient for the zone $Z_2$)

$K_6 = -0.08$ (coefficient for the zone $Z_3$)
$K_7 = 0.32$ (coefficient for the zone $Z_4$).

When aforesaid 1251 scenes were photographed with the exposure being determined by use of the above formula, only 32 scenes got inappropriate exposure.

Figure 14A:
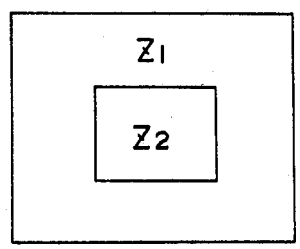
Figure 14B:
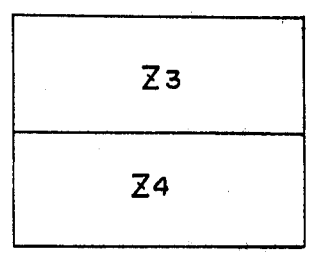

In another embodiment shown in FIGS. 14A and 14B, the scene is divided into a central zone $Z_1$, a marginal zone $Z_2$, an upper zone $Z_3$ and a lower zone $Z_4$. This manner of dividing the scene is effective in distinguishing a scene having a dark background and a backlit scene from each other, since in the former scene the difference between the brightness in the central zone $Z_1$ and that in the marginal zone $Z_2$ is very large, while in the latter scene the difference between the brightness in the upper zone $Z_3$ and that in the lower zone $Z_4$ is very large.

The scene brightness B can be represented by the following formula obtained by modifying the aforesaid formula (3), wherein Bmean (1), Bmean (2), Bmean (3) and Bmean (4) are mean brightnesses in the zones $Z_1$, $Z_2$, $Z_3$ and $Z_4$, respectively.

$$B = K_1 + K_2 \cdot Bmax + K_3 \cdot Bmin + K_4(Bmean(2) - Bmean(1)) + K_5 \cdot (Bmean(4) - Bmean(3)).$$

As the coefficients K in the above formula, the following values may be used for instance.
$K_1 = 1.78$
$K_2 = 0.34$
$K_3 = 0.59$
$K_4 = 0.43$
$K_5 = -0.13$.

When aforesaid 1251 scenes were photographed with the exposure being determined by use of the above formula with the coefficients evaluated above, only 33 scenes got inappropriate exposure.

When calculating the scene brightness B, the mean brightness of the whole scene Bmean may be added.

FIG. 15 shows an example of an exposure control device in which the scene brightness is calculated by use of the mean brightness of the divided zones of the scene. A light measuring portion 1 in this example comprises four zone light measuring portions 93a and 93d for light measuring in the respective zones. The outputs of the photosensors in each zone light measuring portions 93a to 93d are amplified by the amplifier 94 and then inputed into a log-conversion circuit 95 to be log-converted. Then, the log-converted outputs are sent to a mean brightness detecting circuits 96a to 96d for detecting the mean brightness in the respective zones.

The outputs of all the photosensors are also sent to a maximum and minimum brightness detecting circuit 97. The maximum brightness and the minimum brightness detected by the maximum and minimum brightness detecting circuit 97, and the mean brightnesses in the respective zones are sent to a brightness calculating circuit 59. Then the exposure is controlled in a manner similar to that described in connection with FIG. 9.

I claim:

1. A method of determining the correct exposure for photographing a scene in which n various parts thereof have differing amounts of illumination comprising the steps of measuring respective brightness values $B_i$, where $i = 1, 2, 3, \ldots n$, for said n various parts of said scene with respective photosensitive devices sensitive to the brightness of associated ones of said parts; determining the maximum brightness value $B_{max}$ and the minimum brightness value $B_{min}$ from among the measured brightness values $B_i$; automatically assigning weighting factors $K_1$, $K_2$, $K_3$, $K(i+3)$, and $\alpha$ for said brightness values $B_{max}$, $B_{min}$, and $B_i$; electronically computing the correct scene brightness B according to the following formula:

$$B = K_1 + K_2 \cdot B_{max} + K_3 \cdot B_{min} + \alpha \sum_{i=1}^{n} K(i+3) \cdot B_i;$$

and automatically adjusting the camera exposure for photographing said scene in accordance with the calculated scene brightness B.

2. A method as defined in claim 1, wherein said scene can be any of a plurality of classifications including long distance, intermediate distance, and short distance; and further including the step of automatically determining said weighting factors $K_1$, $K_2$, $K_3$, $K(i+3)$, and $\alpha$ in accordance with the classification of said scene.

3. A method as defined in claim 1, wherein said scene can be any of a plurality of classifications including normal illumination, backlit, and spotlighted; and further comprising the step of automatically determining said weighting factors $K_1$, $K_2$, $K_3$, $K(i+3)$, and $\alpha$ in accordance with the classification of said scene.

4. A method as defined in claim 2 or claim 3, wherein said photosensitive devices are grouped into a plurality of zones of said scene, and further comprising the steps of calculating the mean brightness value for each said zone, and automatically determining the classification of said scene based on a relation of mean brightness values of said zones to one another.

5. A method as defined in claim 2 or claim 3, further comprising automatically determining the average brightness value $B_{mean}$ from the brightness values provided from all said photosensitive devices, and automatically determining the classification of said scene based on a relationship of a weighted sum $$\sum_{i=1}^{n} K(i+3) B_i$$

of said brightness values $B_i$ to said average brightness value $B_{mean}$.

6. A method as defined in claim 1, wherein said photosensitive devices are mounted on a camera which can be rotated to select a horizontal format and a vertical format, and further comprising the step of automatically changing the values of said weighting factors $K(i+3)$ when said camera is rotated between said horizontal and vertical formats to achieve correct determination of said brightness B in any of said formats.

7. Scene brightness measuring apparatus for automatically setting the correct exposure of a camera for photographing a scene, n various parts of which have differing amounts of illumination, comprising a plurality of photosensors arranged in a light-measuring portion of said camera to measure respective brightness values $B_i$ for said n various parts of said scene, where $i = 1, 2, 3, \ldots n$; detecting circuit means for determining the maximum brightness value $B_{max}$ from among the measured brightness values $B_i$ and for determining the minimum brightness value $B_{min}$ from among said measured brightness values $B_i$; calculating circuit means to which said measured brightness values $B_i$ and said minimum and maximum brightness values $B_{max}$ and $B_{min}$ are applied and providing a correct exposure brightness value B determined according to the relationship:

$$B = K_1 + K_2 B\text{max} + K_3 B\text{min} + \alpha \sum_{i=1}^{n} K_{(i+3)} B_i$$

where $K_1$, $K_2$, $K_3$, $\alpha$, and $K(i+3)$ are predetermined weighting factors; and exposure operating and control circuit means receiving said correct exposure brightness value B to establish the correct camera exposure for said scene.

8. Scene brightness measuring apparatus as defined in claim 7, further comprising scene classifying circuit means coupled to said calculating circuit means for automatically selecting values of said predetermined weighting factors $K_1$, $K_2$, $K_3$, $\alpha$, and $K(i+3)$ in accordance with a determined one of a plurality of classifications of said scene.

9. Scene brightness measuring apparatus as defined in claim 8, wherein said plurality of classifications of said scene includes long distance, intermediate distance, and short distance.

10. Scene brightness measuring apparatus as defined in claim 8, wherein said plurality of classifications of said scene includes normal illumination, backlit, and spotlighted.

11. Scene brightness measuring apparatus as defined in claim 7, wherein said camera can be rotated to select a horizontal format and a vertical format, and further comprising position detecting means sensitive to the position of said camera and coupled to said calculating circuit means to provide a position signal thereto to change the values of said weighting factors $K(i+3)$ when said camera is rotated between said horizontal and vertical formats to achieve correct determination of said brightness B in any of said formats.

12. Scene brightness measuring apparatus for automatically setting the correct exposure of a camera for photography a scene, n various parts of which have differing amounts of illumination, comprising a plurality of photosensors arranged in a light-measuring portion of said camera, each measuring a respective brightness value $B_i$ for one of said n various parts of said scene, where i=1, 2, 3, . . . n; detecting circuit means for detecting the maximum brightness value $B_{max}$ and the minimum brightness value $B_{min}$ from among the measured brightness value $B_i$; means for detecting the mean brightness value $B_{mean}$ for all said brightness values $B_i$; calculating circuit means having inputs to receive said maximum, minimum, and mean brightness values $B_{max}$, $B_{min}$, and $B_{mean}$ and an output providing a correct-exposure brightness value B calculated according to the following relationship $$B = K_1 + K_2 B_{max} + K_3 B_{min} + \alpha B_{mean}$$

where $K_1$, $K_2$, $K_3$, and $\alpha$ are predetermined weighting factors; and exposure operating and control circuit means receiving said correct-exposure brightness value B to establish the correct exposure for said camera to photograph said scene.

13. Scene brightness measuring apparatus for automatically setting the correct exposure of a camera for photographing a scene, which scene is divided into N zones, comprising a plurality of photosensors disposed in a light-measuring section of said camera and arranged in groups so that each respective group of said photosensors provides brightness values corresponding to illumination brightness within an associated one of said zones; detecting means for detecting the maximum brightness value $B_{max}$ and the minimum brightness value $B_{min}$ from among the brightness values sensed by said plurality of said photosensors; average value detecting circuit means providing a mean brightness value $B_{mean}$ (i) for each said zone, where i=1 to N; scene brightness calculating circuit means coupled to receive said maximum brightness value $B_{max}$, said minimum brightness value $B_{min}$, and said mean brightness values $B_{mean}$ (i), and providing a scene brightness value B according to the relationship $$B = K_1 + K_2 \cdot B\text{max} + K_3 \cdot B\text{min} + \alpha \sum_{i=1}^{N} K_{(i+3)} \cdot B\text{mean}(i)$$

where $K_1$, $K_2$, $K_3$, $\alpha$, and $K(i+3)$ are predetermined weighting coefficients; and exposure operating and control circuit means receiving said scene brightness value B and, in response, establishing the correct exposure for said camera to photograph said scene.

* * * * *